United States Patent [19]

Durling

[11] 4,121,873
[45] Oct. 24, 1978

[54] VEHICLE AIR BRAKE SYSTEM WITH EMERGENCY FEATURES

[75] Inventor: Harold Durling, Elsie, Mich.

[73] Assignee: Midland-Ross Corporation, Cleveland, Ohio

[21] Appl. No.: 738,351

[22] Filed: Nov. 3, 1976

[51] Int. Cl.² .............................................. B60T 13/44
[52] U.S. Cl. ........................................... 303/7; 303/9; 303/28; 303/40
[58] Field of Search ................ 303/25, 27, 28, 29, 303/30, 71, 40, 7, 9; 188/345

[56] References Cited

U.S. PATENT DOCUMENTS

| 3,115,371 | 12/1963 | Valentine | 303/29 |
| 3,279,867 | 10/1966 | Bueler | 303/40 X |
| 3,419,315 | 12/1968 | Bueler | 303/71 |
| 3,429,621 | 2/1969 | Bueler | 303/71 |
| 3,450,154 | 6/1969 | Bueler | 303/40 X |
| 3,525,555 | 8/1970 | Meyer et al. | 303/40 |
| 3,863,992 | 2/1975 | Kurke et al. | 303/71 |
| 4,017,125 | 4/1977 | Durling | 303/7 |
| 4,050,746 | 9/1977 | Durling | 303/40 |

FOREIGN PATENT DOCUMENTS 2,326,708  12/1974  Fed. Rep. of Germany ............ 303/28

Primary Examiner—George E. A. Halvosa
Attorney, Agent, or Firm—H. Duane Switzer

[57] ABSTRACT

An air brake system for a vehicle having front service and parking brakes, and rear service and parking brakes, includes separate front service, rear service and parking air systems. In the event of a failure in either service air system, normal operation of the service brake control will automatically operate the parking brakes associated with the failed service brakes.

4 Claims, 3 Drawing Figures

VEHICLE AIR BRAKE SYSTEM WITH EMERGENCY FEATURES

BACKGROUND OF THE INVENTION

This application relates to the art of air brake systems and, more particularly, to air brake systems which include parking brakes.

Vehicles having front and rear axles have been provided with both service and parking brakes for the wheels on the front and rear axles. In order to provide controlled braking in the event of a failure in the service brakes, a known system provides a visual or audible signal to the operator who can then manually operate the parking brakes with a separate control. A system of this type is very awkward and it would be more desirable to have a system wherein the parking brakes would be automatically applied by operation of the service brake control in the event of a failure in the service brakes. A known system of that type is provided for vehicles having parking brakes only on the wheels mounted on the rear axle of the vehicle. Therefore, a failure in the service brakes for the wheels on the front axle results in the complete loss of braking force for the wheels on the front axle.

SUMMARY OF THE INVENTION

An air brake system for a vehicle having front service and parking brakes, and rear service and parking brakes, includes separate front service, rear service and parking air systems. Selectively operable service control means of simultaneously operates the front and rear service brakes off the front and rear service air systems respectively during normal operation of the air brake system. Parking brake control means has passive and actuated modes, and is in its passive mode during normal operation of the air brake system. The parking brake control means is automatically movable to its actuated mode in response to a failure in either of the front or rear service air systems. In its passive mode, the parking brake control means is ineffective to operate the parking brakes. However, in its actuated mode, the parking brake control means is effective, in response to operation of the service control means, to operate off the parking air system, the parking brakes associated with the service brakes normally operated by the failed service air system.

In a preferred arrangement, the parking brake control means in its actuated mode operates both the front and rear parking brakes in response to operation of the service control means.

In its actuated mode, the parking brake control means preferably operates the parking brakes to provide braking force proportional to the braking force provided by the unfailed service brakes.

Sensing means is preferably provided for sensing a failure in either of the service air systems and automatically moving the parking brake control means to its actuated mode.

In one arrangement, the air brake system includes front service, rear service and parking air reservoirs to which air is supplied from a compressor through a sensing air reservoir. Check valves are provided between the sensing air reservoir and the front service, rear service and parking air reservoirs for preventing air flow in a direction from the front service, rear service and parking air reservoirs back to the sensing air reservoir. The sensing air reservoir is at a predetermined pressure during normal operation of the air brake system and is bled to a substantially lower pressure by a failure in either of the front or rear service air systems. The parking brake control means is automatically moved to its actuated mode in response to lowering of the pressure in the sensing air reservoir from its predetermined pressure to a substantially lower pressure.

In one arrangement, the check valves between the sensing air reservoir and the front service, rear service and parking air reservoirs provide air flow from the sensing air reservoir to the front service, rear service and parking air reservoirs only when the pressure in the sensing air reservoir is substantially above atmospheric pressure although well below the predetermined pressure at which the system normally operates. This enables continuous operation of the brake system at reduced air pressure.

It is a principal object of the present invention to provide an improved vehicle air brake system having emergency brakes which are automatically operated off the service brake control in the event of a failure in either the front or rear service brakes.

It is a further object of the invention to provide a vehicle air brake system which automatically senses a failure in either front or rear service brakes for automatically applying parking brakes associated with the failed service brakes when the service brake control is operated.

It is also an object of the invention to provide such an air brake system wherein application of the parking brakes is proportional to pressure signals supplied through the service brake control.

DESCRIPTION OF A PREFERRED EMBODIMENT

Figure 1:
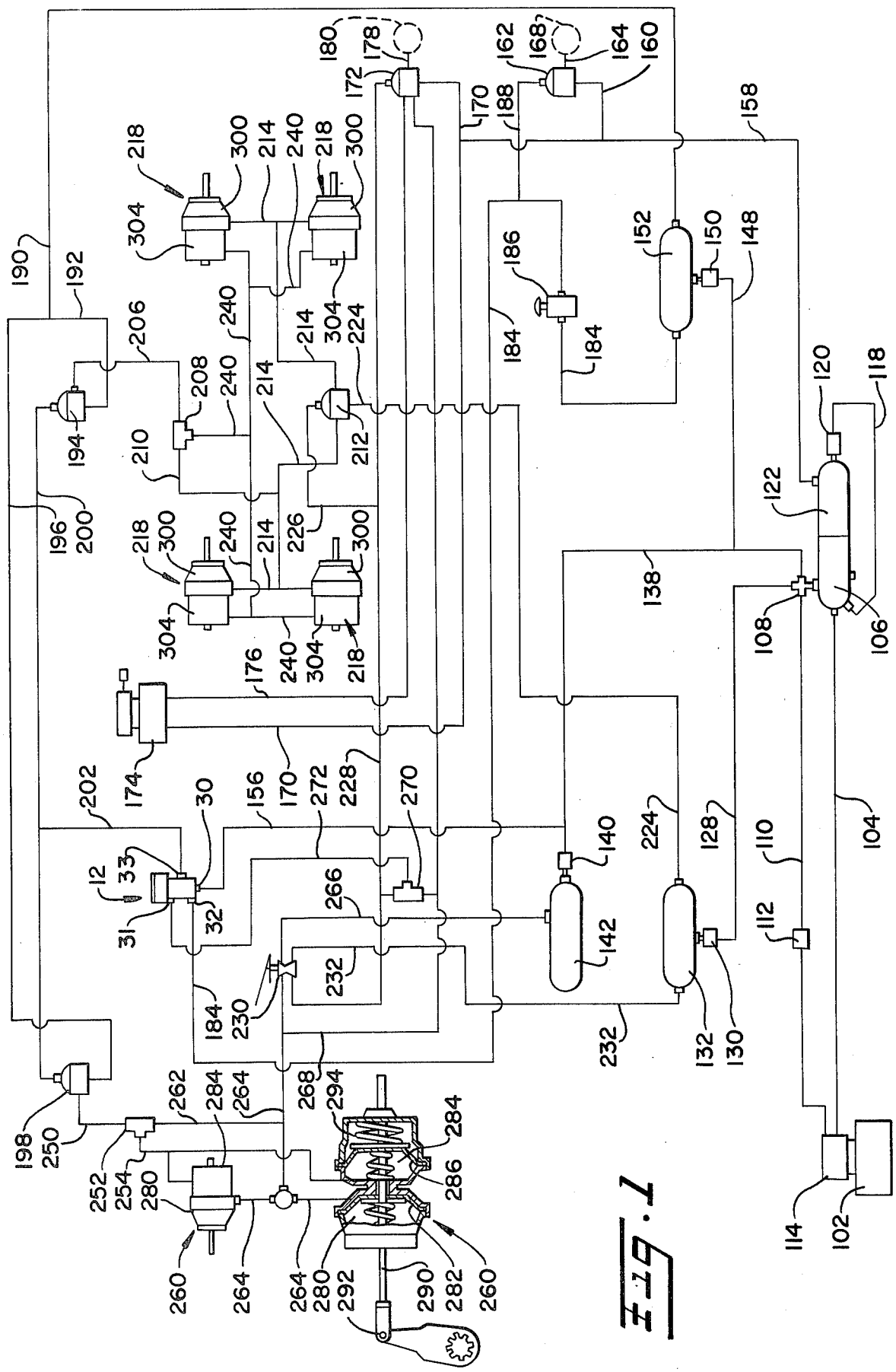
FIG. 1 is a schematic illustration of a vehicle air brake system having the improvements of the present invention incorporated therein.

With reference to the drawing, FIG. 1 shows a vehicle air brake system including an air compressor 102 driven by the vehicle engine in a known manner and having its output connected by line 104 with a sensing air reservoir 106 which is normally pressurized to around 125 psig. A cross fitting 108 on sensing reservoir 106 has a plurality of output lines connected thereto, including output line 110 connected through governor 112 with compressor unloader 114 for unloading compressor 102 when sensing reservoir 106 is charged with the desired pressure. When the pressure in sensing reservoir 106 drops to a certain point below the desired normal pressure, unloader 114 operates to again load compressor 102 for supplying compressed air to sensing reservoir 106.

Sensing reservoir 106 is connected through line 118 and check valve 120 with trailer reservoir 122; through line 128 and check valve 130 with rear service reservoir 132; through line 138 and check valve 140 with front service reservoir 142; and through line 148 and check valve 150 with secondary and parking reservoir 152. Line 156 connected with line 138 effectively connects sensing reservoir 106 directly to first inlet port 30 of inversion valve 12 which also defines a parking brake control means.

Line 158 from trailer reservoir 122 is connected by line 160 with relay 162 having a line 164 leading to a connection 168 for a trailer parking or emergency brake. Line 158 is also connected with line 170 in turn connected with triple relay 172 and with a trailer hand control valve 174 connected back with triple relay 172 through line 176. Line 178 from triple relay 172 leads to a connection 180 for connection with trailer service brakes.

Secondary and parking air reservoir 152 has an outlet line 184 including a park valve 186 and is connected by line 188 with relay 162. Line 184 is also connected with inlet port 32 of inversion valve 12. Secondary and parking air reservoir 152 has another outlet line 190 connected by line 192 with relay 194 and by line 196 with relay 198. Relays 194 and 198 are connected by a line 200 which in turn is connected by line 202 with delivery port 33 of inversion valve 12.

Relay 194 is connected by line 206 with two-way check valve 208 which is also connected by line 210 with line 214 from relay 212 and the service chambers of vehicle rear brake actuators 218. Relay 212 is connected by line 224 with rear service reservoir 132 and by line 226 with service line 228 connected through service control means 230 in the form of a treadle valve which is connected with line 232 from rear service air reservoir 132. Two-way check valve 208 is connected by line 240 with the parking air chambers of rear brake actuators 218.

Relay 198 is connected by line 250 through two-way check valve 252 to line 254 connected with the parking air chambers of front brake actuators 260. Two-way check valve 252 is connected by line 262 with service line 264 leading through service control means 230 to front service reservoir 142 through line 266. A line 268 connected with service line 264 extends back to triple relay 172 for controlling the trailer service brakes.

A two-way check valve 270 is connected with both of service lines 228 and 268, and has its output connected with line 272 leading to port 31 of inversion valve 12.

Brake actuators 218 and 260 are of a conventional dual diaphragm type. The interior of one of the front brake actuators 260 is shown somewhat diagrammatically for purposes of illustration. A forward or service brake chamber 280 has a diaphragm 282 therein. A rear parking or emergency brake chamber 284 includes a diaphragm 286. Service chamber 280 normally operates the vehicle brakes by receiving air at service pressure through line 264 to displace diaphragm 282 against elongated output shaft 290 to stroke same for rotating a conventional slack adjuster mechanism 292 and applying the vehicle brakes. During normal operation of the vehicle, emergency brake air chamber 284 is supplied with air at supply pressure through line 254 to hold diaphragm 286 to the right in FIG. 1 for compressing spring 294. When air is vented from emergency or parking brake air chamber 284, spring 294 expands against output shaft 290 for rotating slack adjuster mechanism 292 and applying the vehicle parking brakes. The controlled manner in which compression spring 294 expands depends upon the amount of air vented from the parking brake air chamber 284 through the inversion valve 12. Rear brake actuators 218 have service brake air chambers 300 corresponding to chambers 280 and parking brake air chambers 304 corresponding to parking air chambers 284.

Figure 2:
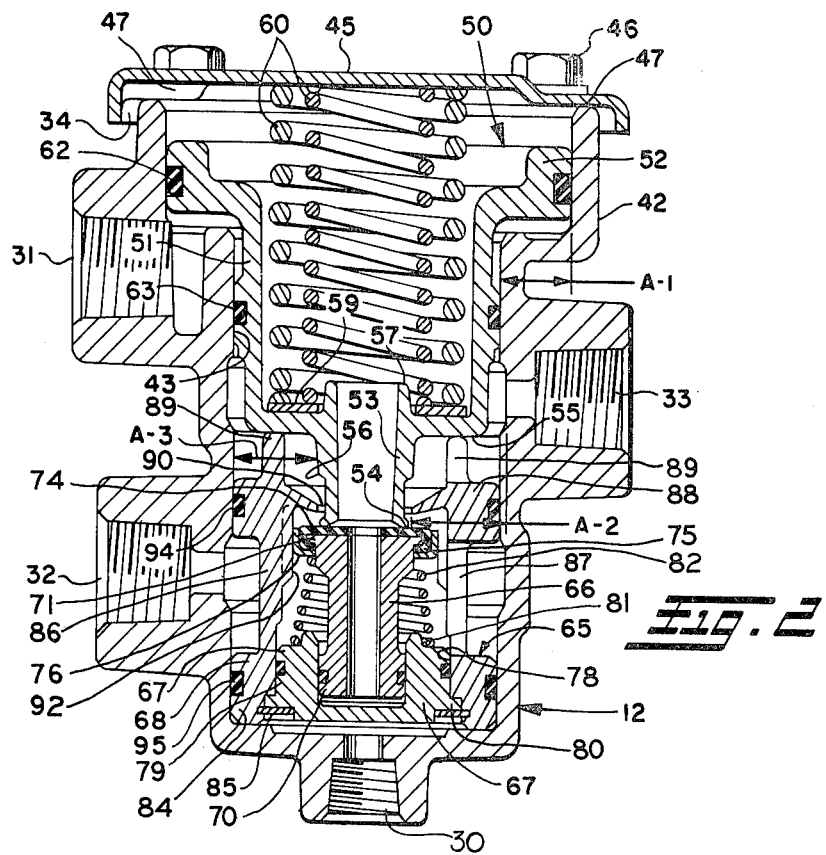
FIG. 2 is a cross-sectional elevational view of a parking brake control used with the system of FIG. 1.
Figure 3:
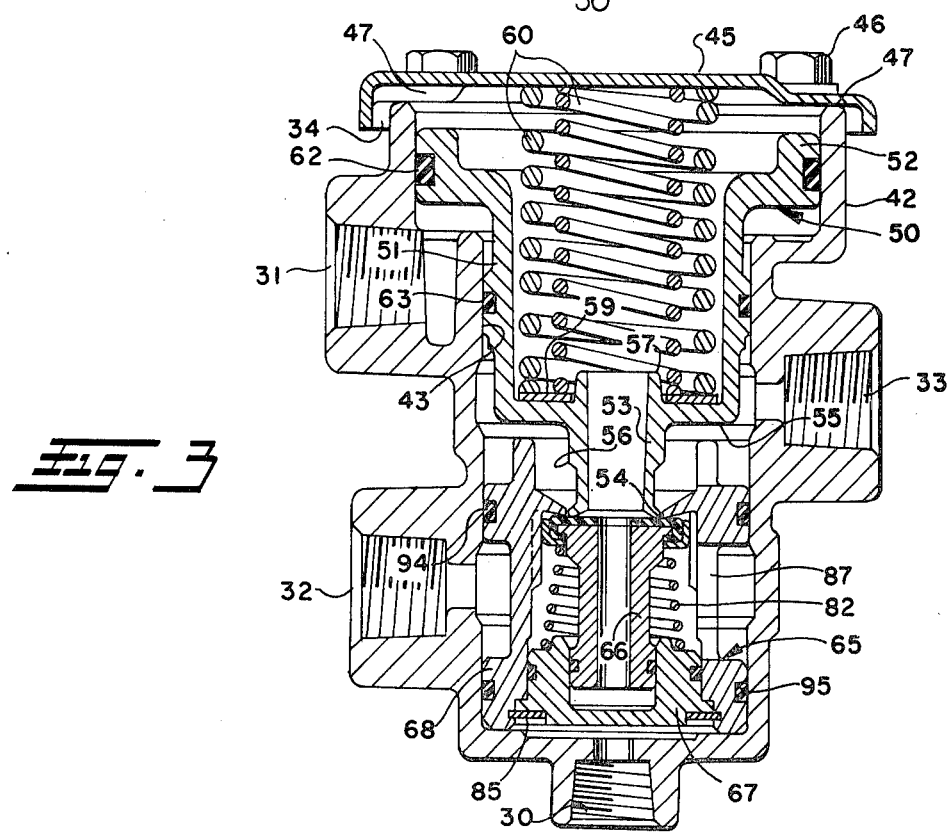
FIG. 3 is a cross-sectional elevational view similar to FIG. 2 showing the valve in another position.

Referring now to FIGS. 2 and 3, inversion valve 12 is shown to include a valve body 42 having a stepped cylindrical bore 43 extending therein. First inlet port 30 is in fluid communication with bore 43 at one end thereof and bore 43 is closed at its opposite end by a vent cover 45 threadably fastened as at 46 to valve body 42. Ribs 47 in vent cover 45 engage the valve body's end portion opposite first inlet port 30 to define a plurality of vent passages or vent ports 34 in fluid communication with the interior of valve body 42. In between vent port 34 and first inlet port 30 are second inlet port 31, third inlet port 32 and delivery port 33, all in fluid communication with bore 43. Disposed within bore 43 adjacent vent ports 34 is a first hollowed, cylindrically stepped tubular piston 50 having a main body portion 51, a radially outwardly stepped upper end portion 52 generally adjacent vent ports 34, and an opposite radially inwardly stepped lower annular shoulder seat surface 55 terminating in a longitudinally extending hollow stem portion 53 which in turn terminates in a flanged conical first valve seat 54. The exterior of hollow stem portion 53 is stepped radially outwardly as at 56 and stem portion 53 extends into the interior of main body portion 51 to define a boss 57 for retaining a spacer-washer 59 serving as a seat for a pair of compression springs 60 functioning as biasing means to bias first piston 50 towards first inlet port 30. First piston 50 is sealingly guided within bore 43 by sealing means in the form of O-rings 63, 62 disposed within grooves located in main body portion 51 and end portion 52 respectively. The area of piston 50 between O-rings 62, 63 defines a first pressure responsive area of the valve, hereindefined as "A-1". The area circumscribed between first valve seat 54 and O-ring 63 is defined as the second pressure responsive area of valve 12, hereindefined as "A-2".

Disposed in bore 43 adjacent first inlet port 30 is a second piston or piston means 65 defined as comprising a piston member 66, an end cap member 67 and a valve cage member 68. Piston member 66 has a cylindrical base portion 70 at one end and a flanged end portion 71 at its opposite end. Capping the end of flanged end portion 71 is an annular seal 74 made of resilient material and having its outer periphery U-shaped as at 75 for sealing engagement with piston member flanged end portion 71. Seal 74 is grasped about its outer periphery by a metal cup-shaped annular retainer 76.

Base portion 70 of piston member 66 is adapted to be sealingly received within a centrally located, blind bore portion 78 of end cap member 67. End cap member 67 has a cylindrical main body portion 79, a flanged base portion 80 adjacent first inlet 30, and an upper inwardly shouldered end 81. Shouldered end 81 functions as a spring seat for one end of a conical spring 82 which is seated at its opposite end underneath cup-shaped annular retainer 76.

Flanged base portion 80 of end cap member 67 is lockingly engaged within a base portion 84 of valve cage member 68 by means of a snap ring 85. Valve cage member 68 is of tubular shape having a main body portion 86 extending from base portion 84, indented radially inwardly in the area of third inlet port 32, and having a plurality of radial openings or windows 87 to permit air passage from third inlet port 32 to its interior. Extending from main body portion 86 is a forward portion 88 from which extends a plurality of shouldered stops 89 extending in an annular array from forward portion 88 and adapted to contact shouldered seat surface 55 of first piston 50. Extending radially inwardly from the interior of forward portion 88 is a frusto-conical second valve seat 90 having a diameter toleranced closely to the diameter of first valve seat 54 and, as shown in FIG. 2, being closely concentric with stem portion 53. Formed in the interior of valve cage member 68 and extending from second valve seat 90 towards base portion 84 are a plurality of splines 92 having an internal diameter sized closely to the external diameter of cup-shaped retainer 76 for guiding piston member 66 in its movement. The spaces between splines 92 define passages for air flow through valve seat 90 and radial openings 87 from third inlet port 32 to delivery port 33. Sealing means for second piston 65 are provided in the form of O-rings 95, 94 received within grooves formed in base and forward portions 84, 88 respectively.

O-rings 94, 95 function as sealing means to define a third pressure responsive area "A-3" of valve 12 specifically defined radially between O-rings 94, 95 and second valve seat 90. Bore 43, and the diameters of pistons 50, 65, are sized equally along their lands which contain O-rings 63, 94 and 95. Pressure responsive areas "A-2" and "A-3" may be considered to be equivalent to one another and pressure responsive area "A-1" is sized greater than each pressure responsive area "A-2", "A-3", preferably at a ratio of 1.5 to 1.

The operation of inversion valve 12 will be explained with reference to the brake system shown in FIG. 1 and the vehicle in a parked position with a depressurized air system. In this mode, reservoirs 106, 122, 132, 142 and 152 are uncharged, with service brake lines 228 and 268 vented to atmosphere at treadle valve 230 thus venting line 272 and second inlet port 31 of inversion valve 12. Park valve 186 is vented to atmosphere thus venting line 184 and third inlet port 32 to atmosphere. Lines 138 and 156, along with first inlet port 30 of inversion valve 12, are also unpressurized. With the pressures thus established, the component parts of inversion valve 12 will assume the position shown in FIG. 2. With little or no pressure at first inlet port 30, the force exerted by compression springs 60 is sufficient to bias first piston 50 downwardly in valve bore 43 sealing first valve seat 54 against seal 74 and contacting annular shoulder surfaces 55 with shoulder stops 89 forcing first and second pistons 50, 65 to "column-up" until base portion 84 of cage member 68 contacts the bottom of valve bore 43. In this position, first valve seat 54 is sealed and second valve seat 90 is open to establish communication between ports 32 and 33 through openings 87 in cage member 68, past splines 92, around annular retainer 76, past seat 90, past stops 89 and past shoulder 55. With park valve 186 open to atmosphere, line 184 and port 32 are vented to atmosphere. Port 33 is also vented to atmosphere in the valve position of FIG. 2 because port 33 communicates with port 32. This vents lines 202, 200 so that relays 194, 198 are shuttled to respectively vent lines 206, 240, and 250, 254, so that parking brake air chambers 284 and 304 are vented and the springs are extended to apply the parking brakes.

When the operator of the vehicle starts the engine, compressor 102 automatically charges all the reservoirs with air at supply pressure. Air at supply pressure from sensing reservoir 106 is then ported via lines 138, 156 into first inlet port 30 causing pistons 50, 65 to move upwardly in a column, compressing springs 60, until end portion 52 of first piston 50 contacts vent cover 45 which acts as a solid stop. In this pressurized mode, first and second valve seats 54, 90 remain in their same relative position as previously described for the depressurized mode, and ports 32, 33 remain in communication through the internal passages previously described. This is the passive mode of valve 12 during normal operation of the air brake system. When park valve 186 is moved to its parking brake releasing position, it is no longer vented to atmosphere so a pressure signal is sent from parking reservoir 152 through line 184 to port 32 of inversion valve 12. This pressure signal passes through the internal valve passage previously described to port 33 where it passes through lines 202 and 200 to relays 194 and 198 for shifting those relays so that lines 206 and 250 are no longer vented to atmosphere through those relays. Instead, line 192 communicates through relay 194 with line 206. Likewise, line 196 communicates through relay 198 with line 250. Therefore, air is supplied directly from parking reservoir 152 through line 190, line 192, relay 194, line 206, two-way check valve 208 and line 240 to parking brake chambers 304 of rear brake actuators 218 to release the rear parking brakes. Line 190 also communicates through line 196, relay 198, line 250, two-way check valve 252, and line 254 with parking brake chambers 284 of front brake actuators 260 for releasing the front parking brakes. In this condition of the system, the service brakes are applied and released in the normal manner by operation of treadle valve 230. Operation of treadle valve 230 establishes communication of front service air reservoir 142 through lines 266 and 264 with service brake chambers 280 of front brake actuators 260 to operate the vehicle front service brakes. Simultaneously, communication is established through treadle valve 230 from line 232 to line 228 for sending a pressure signal through line 226 to relay 212 which shuttles for opening communication from line 224 to line 214 which communicates with service brake chambers 300 of rear brake actuators 218 so that the rear service brakes are applied proportionately to be front service brakes. Lines 228 and 268 extend back to triple relay 172 for providing signals to operate that relay and supply pressure to trailer service brakes from trailer reservoir 122 if a trailer is being towed by the vehicle. As long as operation of the system is normal, inversion valve 12 remains in its passive mode and any signals passing through line 272 to port 31 have no effect because the valve 12 remains in its "column-up" position and any pressure entering the valve through port 31 is simply confined between seals 62, 63.

Any failure in either the front or rear service air system will initiate operation of inversion valve 12 for automatically applying the parking brakes associated with the failed service brakes upon operation of service control means 230. Any failure in either front or rear service reservoirs 142 or 132, or any of the lines leading therefrom, will cause movement of inversion valve 12 from its passive mode to its actuated mode. A failure in either the front or rear service air systems will cause air to flow from sensing reservoir 106 through either lines 128 or 138 at a much faster rate than compressor 102 is capable of supplying to recharge sensing reservoir 106. Therefore, the pressure in sensing reservoir 106 falls quite rapidly as does the pressure in line 138 and line 156. The reduced pressure at port 30 will no longer be capable of holding pistons 50 and 65 in the upward position. Air at supply pressure still exits through line 184 to port 32 and this is acting generally over area "A-3" on pistons 50 for maintaining same in its upward position against cover 45. The same supply pressure is acting downwardly on piston 65 so that it moves downwardly away from piston 50. This would cause second valve seat 90 to move closer to seal 74 until it eventually contacts seal 74. Up until the point where valve seat 90 contacts seal 74, conical spring 82 maintains first valve seat 54 in sealing engagement with seal 74. However, once valve seat 90 contacts seal 74 and further downward movement of piston 65 occurs, first valve seat 54 will be opened by being out of engagement with seal 74, while second valve seat 90 will remain sealed against seal 74. When this happens, supply pressure entering the valve through port 32 is trapped within cage member 68 against passage past valve seat 90. Therefore, the supply pressure entering the valve through port 32 is no longer effective to bias piston 65 downwardly or upwardly. Therefore, when first valve seat 54 moves out of engagement with seal 74, air in line 202 will vent to atmosphere by flowing from port 33 past shoulder stops 89, past valve seat 54 to the interior of stem portion 53, and upwardly through springs 60 for venting through passages 34 under cover 45. This will also vent the supply pressure which was acting generally over area "A-3" tending to hold piston 50 upwardly. Springs 60 will then move piston 50 downwardly until the pressure acting upwardly on the piston 50 is equal to the force of springs 60. The valve will then be in a lapped position as shown in FIG. 3 with both seats 54 and 90 sealed against seal 74. If there has been a complete failure in the air system, first piston 50 will be at the bottom of bore 43 with the biasing force of springs 60 being balanced by the pressure acting against the bottom of piston 50 generally over area "A-3" so that springs 294 of the brake actuators are still compressed and valve 12 is ready to cycle for quick application of the parking brakes.

With valve 12 in its actuated mode, operation of service control means 230 will still send signals through either line 228 or 268 depending upon whether the front or rear service brake system has failed. The signal in the unfailed line passes through two-way check valve 270 and line 272 to inlet port 31. This service air pressure signal acts against area "A-1" to move first piston 50 upwardly toward cap 45 to separate seat 54 from seal 74 and open port 33 to atmosphere through vents 34. This further reduces the pressure in lines 202 and 200 so that relays 194 and 198 shuttle to exhaust pressure in lines 206 and 250 to atmosphere. This reduces the air pressure in parking brake chambers 284 and 304 to a degree proportional to the service air signal sent to port 30 so that the springs of the parking brakes will apply those brakes with a force proportional to the application force of the unfailed service brakes. As the pressure acting on piston 50 over area "A-3" is reduced, the service pressure acting over area "A-1" combined with the pressure remaining acting over the area "A-3" will become balanced against the force of springs 60 and the valve will return to its lapped position. It is preferable to have area "A-1" somewhat greater than each of areas "A-2" or "A-3", and preferably 1.5 times greater. This permits air pressure within the parking brake chambers to drop in pressure at a rate 1.5 times as great as that which is applied by air at service pressure. The brake application force applied by the parking brakes will then be generally proportional to the braking force effected by unfailed service brakes.

After a service brake application has been completed and service brake control means 230 is closed, the pressure in line 228 or 268 is vented to atmosphere through service control means 230. This also vents line 272 and port 31 for reducing the pressure acting on piston 50 over area "A-1". Springs 60 will force piston 50 downwardly until first valve seat 54 engages seal 74 and compresses conical spring 82 for moving seal 74 away from valve seat 90. This will again establish fluid communication between ports 32 and 33 so that pressure builds up in area "A-2" and pressure will be supplied to the parking brake chambers of the brake actuators to release the parking brakes and until equilibrium pressure is reached with springs 60 whereupon piston 50 will move toward cap 45 so that the parts are again in the lapped position shown in FIG. 3. This returns the valve to its actuted mode ready to be operated in the next service brake application.

When simple check valves are used at 120, 130, 140 and 150, each air reservoir is protected but cannot be recharged as long as there is a failure in one of the other systems. This means that a number of service brake applications can be made only until the pressure in the remaining air reservoirs is reduced to an inoperative level. Instead of having such an arrangement, it is possible to add pressure protection valves at 120, 130, 140 and 150. Such pressure protection valves would seal the supply line to the leaking reservoir when system pressure is below the pressure protection valve setting. This would allow the vehicle air compressor to replenish and maintain pressure in the intact part of the air systems up to the pressure protection valve setting. The vehicle brake system could then be operated indefinitely so the driver could get to a repair facility. By way of example, such pressure protection valves could be of the type which opened initially at around 100 psig and would be held open by a pressure within each reservoir of around 80 psig. Thus, when compressor 102 first starts supplying air to the reservoirs, all of the pressure protection valves would eventually open at 100 psig for charging all of the air reservoirs to system pressure of around 125 psig. Once the pressure within each reservoir is around 80 psig, each pressure protection valve would be held open. In the event of a failure in any reservoir, lowering of the pressure in that reservoir below 80 psig would close its pressure protection valve.

The other pressure protection valves would remain open because the pressure in the reservoirs would still be above 80 psig. Therefore, the compressor could keep running for recharging the unfailed reservoirs up to around 100 psig. This reduced system pressure would still operate the brakes until the driver could get to a repair facility.

In the vehicle air brake system described, there are separate front service, rear service and parking air systems generally defined by reservoirs 142, 132 and 152 respectively. Selectively operable service control means 230 simultaneously operates the front and rear service brakes off the front and rear service air systems respectively during normal operation of the air brake system. Valve 12 defines a parking brake control means having passive and actuated modes. During normal operation of the air brake system, parking brake control means 12 is in its passive mode and is automatically movable to its actuated mode in response to a failure in either the front or rear service air system. In its passive mode, the parking brake control means defined by valve 12 is ineffective to operate the parking brakes. However, in its actuated mode, the parking brake control means defined by valve 12 is effective in response to operation of service control means 230 to operate off the parking air system the parking brakes associated with the service brakes normally operated by the failed service air system.

In the arrangement shown and described, the parking brake control means 12 in its actuated mode operates both the front and rear parking brakes in response to operation of service control means 230 when either the front or rear service brakes have failed. The parking brakes are operated to provide a braking force proportional to the braking force provided by the unfailed service brakes.

The arrangement whereby pressure acting through line 156 to port 30 of valve 12 may be considered a sensing means for sensing a failure in either of the service air systems and automatically moving the parking brake control means to its actuated mode prior to initial operation of service control means 230. The parking brake control means defined by valve 12 is operative in its actuated mode to operate the parking brakes in response to signals supplied through service control means 230 from the unfailed service air system. The pressure at port 30 which causes movement of valve 12 from its passive mode to its actuated mode can be any pressure somewhat below the normal system pressure of around 125 psig. For example, valve 12 could be moved to its actuated mode at any pressure from around 0–100 psig.

In the system described, the parking brakes are spring biased to engaged positions and are moved to disengaged positions by air pressure supplied from the parking air system under control of the parking brake control means defined by valve 12. The parking brake control means defined by valve 12 is operative in its actuated mode to bleed air through relays 194 and 198 from the parking brake air chambers in an amount proportional to the service pressure signal sent through service control means 230. This means that the parking brakes will be applied with a force generally proportional to the service brakes when either the front or rear service brakes have failed.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

I claim:

1. An air brake system for a vehicle comprising; front service and parking brakes, rear service and parking brakes, separate front service, rear service and parking air systems which respectively include front, rear and parking air reservoirs, a sensing air reservoir through which air is supplied from a compressor to said front, rear and parking air reservoirs, check valves between said sensing air reservoir and said front, rear and parking air reservoirs for preventing air flow in a direction from said front, rear and parking air reservoirs back to said sensing air reservoir, said sensing air reservoir being at a predetermined pressure during normal operation of said air brake system and being bled to a substantially lower pressure by a failure in either of said front or rear service air systems, selectively operable service control means for simultaneously operating said front and rear service brakes off said front and rear service air systems respectively during normal operation of said air brake system, a single parking brake control valve connected for sensing the pressure in said sensing reservoir and being movable between passive and actuated modes, said parking brake control valve being in said passive mode during normal operation of said air brake system and being automatically moved to said actuated mode in response to lowering of the pressure in said sensing air reservoir from said predetermined pressure to said substantially lower pressure due to a failure in either of said front or rear service air systems, said parking brake control valve in said passive mode being ineffective to operate said parking brakes in response to operation of said service control means, said parking brake control valve in said actuated mode being effective, in response to operation of said service control means, to operate off said parking air system in a controlled manner of application and release, the parking brakes associated with the service brakes normally operated by the failed service air system.

2. The air brake system of claim 1 wherein said check valves provide air flow from said sensing air reservoir to said front, rear and parking air reservoirs only when the pressure in said sensing air reservoir is substantially above atmospheric pressure but well below said predetermined pressure.

3. The air brake system of claim 1 wherein said parking brake control means in said actuated mode operates both said front and rear parking brakes in response to operation of said service control means.

4. The air brake system of claim 1 wherein said parking brake control means in said actuated mode operates the parking brakes to provide braking force proportional to the braking force provided by the unfailed service brakes.

* * * * *